Patented Aug. 26, 1941

2,253,809

UNITED STATES PATENT OFFICE 2,253,809

GAS COMPRESSING APPARATUS AND METHOD OF REGULATING THE SAME

Hans Pfenninger, Wettingen, Switzerland, assignor to Aktiengesellschaft Brown, Boveri & Cie, Baden, Switzerland, a joint-stock company Application December 15, 1939, Serial No. 309,507
In Germany December 27, 1938

9 Claims. (Cl. 263—19)

The invention relates to gas compressing apparatus and methods of regulating the same, and more particularly to apparatus for delivering hot gases under pressure for chemical, metallurgical or other uses.

An object of the invention is to provide relatively simple gas compressor plants including a constant pressure gas turbine, a single combustion chamber for producing the hot combustion gases for operating the gas turbine and heating the useful output gas, and correlated control apparatus for regulating the turbine operation in accordance with the temperature, pressure or quantity of the output gas. Another object is to provide a compressor plant of the type stated for delivering hot compressed air, the plant including a single compressor for supplying the net useful output air and the combustion air for the gas turbine that operates the compressor. Other objects are to provide novel and efficient methods of regulating compressors operated by gas turbines and including a common combustion chamber for producing the pressure gas for the turbine and heating the useful output air or gas. More specifically, an object is to provide a method of regulating a compressor plant including a gas turbine and a common combustion chamber for heating the output gas and supplying motive gas to the turbine, the method comprising controlling the ratio of the compressed air delivered to the combustion chamber and the compressed air supplied directly to the turbine in accordance with a condition of the output gas that is to be maintained substantially constant (such as temperature, pressure or quantity), whereby the speed of the gas turbine is changed and thereby affects another condition of the output gas, and controlling the fuel supply to the combustion gas turbine to effect a further change in the turbine speed to regain the desired conditions or characteristics of the output gas.

Figure 1:
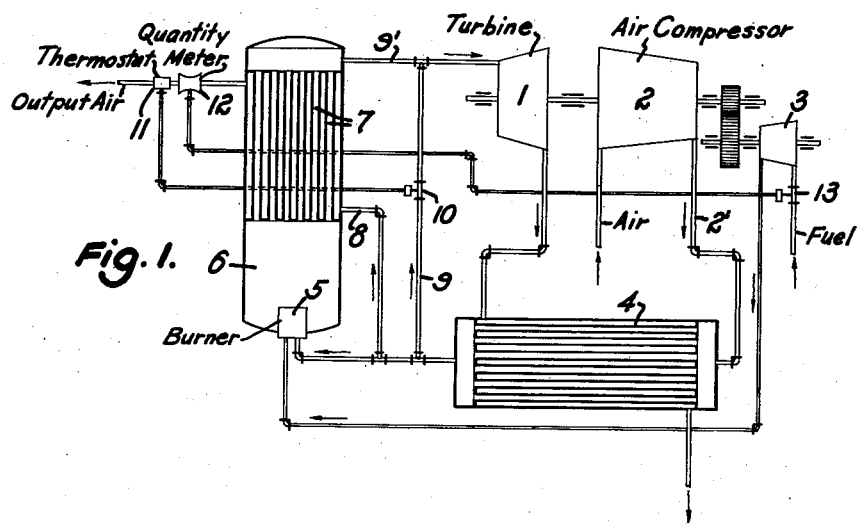
Figure 2:
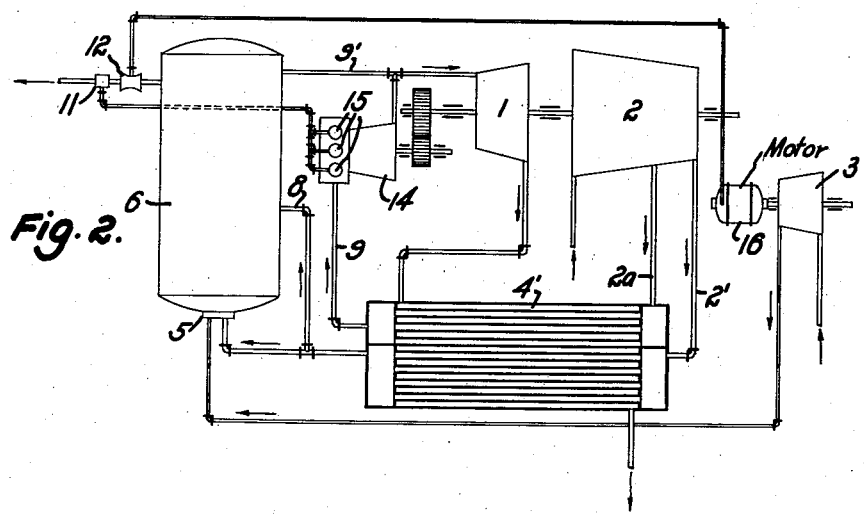

These and other objects and advantages of the invention will be apparent from the following specification when taken with the accompanying drawing in which:

Figs. 1 and 2 are schematic diagrams of different embodiments of the invention.

Constant pressure combustion gas turbines are not characterized by a high efficiency but are of simple construction and frequently used in chemical and metallurgical plants. The gas turbine plants, as previously employed, have been "self-contained" power units that were controlled in various ways and the apparatus operated by the gas turbine was independently controlled, when a control was desired, in accordance with some condition or characteristic of the output apparatus. The present invention contemplates a compressor plant operated by a gas turbine, with control apparatus and methods for regulating the gas turbine in accordance with variations in load on the compressor plant as reflected in a change in some conditions, such as temperature, pressure or quantity, of the useful output gas delivered by the compressor plant.

In Fig. 1, the reference numeral 1 identifies a combustion gas turbine that drives an air compressor 2 of such capacity as to deliver both the useful output air and the air for admixture with fuel from the pump or blower 3 for combustion to supply motives gas to the turbine and to heat the output air. The fuel may be, for example, blast furnace gas when the compressor plant is designed for use in the metallurgical industry to supply hot compressed air as the "blast" for a furnace. Air from compressor 2 flows through pipe 2' and absorbs heat from the turbine exhaust gases in a heat exchanger 4, and a part of the heated compressed air passes to the burner 5 of a combustion chamber 6 in which is located the heat exchanger 7 to which the useful output air is delivered through the passage 8. Another portion of the compressed air from the heat exchanger 4 goes directly to the inlet of turbine 1 through the bypass pipe 9 and regulating valve 10. In general, the hot gases that pass from the combustion chamber 6 to the turbine 1 through pipe 9' are at such high temperature that some admixture of lower temperature air is necessary for the protection of the gas turbine.

The rate of flow of the cooling air through valve 10 is regulated by a control device 11 in the discharge conduit from the heat exchanger 7, and the type of control device depends upon some characteristic of the hot compressed air that is to be maintained substantially constant. As shown by the legend of Fig. 1, the control device 11 may be a thermostat that is coupled to valve 10, as indicated by the broken line, and a second control device 12 such as a quantity meter or pressure gauge is coupled to a regulating valve 13 in the fuel supply line.

The method of operation of the described apparatus is as follows. If the temperature of the output air departs from a predetermined value, for example if it is too low, the thermostat 11 adjusts valve 10 to a more open position to permit a greater quantity of air to pass to the turbine 1 through the bypass pipe 9. Less air is therefore supplied to the burner 5 and the temperature in the combustion chamber 6 rises and the temperature of the output air is thereby increased. The quantity of output air is diminished, however, as the delivery of a larger quantity of air through the bypass pipe 9 results in a lower speed of the turbine 1. The quantity meter 12 therefore adjusts the fuel supply valve 13 to increase the fuel feed and thereby increase the temperature of the motive gas to turbine 1. The gas turbine speed increases with the temperature of the motive gas and the output from compressor 2 rises until air flow through the quantity meter 12 returns to the normal or preselected value. At the same time, the valve 10 is returned to its normal setting by thermostat 11 when the temperature of the output compressed air returns to normal.

Similarly, if the output quantity of air varies without change in its temperature, the quantity meter 12 adjusts the fuel supply valve 13 to restore the desired operating condition. If the air output increases to a value above a preselected load demand, the quantity meter 12 adjusts valve 13 to reduce the fuel supply and all temperatures therefore decrease. The speed of the turbine falls off and the volume of air delivered by compressor 2 decreases. Thermostat 11 effects a partial opening of the bypass valve 10 as the outlet temperature decreases, and the temperature in the combustion chamber 6 therefore increases to effect a corresponding increase in the outlet air temperature.

It will be apparent that substantially the same control operations may be effected by interchanging the connections between the control devices 11, 12 and the valves 10 and 13. The sequence of control steps will be varied by this exchange but the net result will be the same.

The fuel supply valve 13 may be a bypass valve at the outlet side of the blower 3 in place of the illustrated throttling valve in the inlet line to the blower 3. Installations in which the pressure of the output air is more important than the output quantity will have a control device 12 in the form of a pressure gauge.

There is considerable latitude in the design and construction of a gas or air compressor plant that may be regulated in accordance with this invention and certain modifications are shown in the embodiment of Fig. 2. Those parts that are or may be substantially identical with parts shown in Fig. 1 are identified by corresponding reference numerals but will not be described in detail. The air supplied through the bypass pipe 9 may be taken from an intermediate stage of the compressor 2 through pipe 2a when there is a substantial drop of pressure in the flow of combustion gases through the heat exchanger 7. The air for combustion and the useful output air leave compressor 2, as in the Fig. 1 embodiment, through the high pressure pipe 2', and the heat exchanger 4' has separate sections for the air from pipe 2a and that from pipe 2'.

An auxiliary turbine 14 that exhausts into the inlet line 9' of turbine 1 may serve as the means for regulating the speed or energy output of the turbine unit. As shown in Fig. 2, the auxiliary turbine 14 has a plurality of nozzles 15 that receive a pressure medium through the bypass pipe 9 and are opened in sequence in accordance with changes in a characteristic of the output pressure air, for example by the thermostat 11. The control device 12, which may be a quantity meter or a pressure gauge, controls the fuel supply from the pump 3. In place of the throttle valve 13 of Fig. 1, the control from device 12 is imposed upon a variable speed motor 16 that drives the fuel pump 3. Other arrangements are possible by incorporating some of the features of the Fig. 2 compressor plant in the Fig. 1 construction or by supplying combustion air to the burner 5 through the lower pressure output line 2a of compressor 2. The same general method of controlling the turbine operation in accordance with two properties of the useful output gas is characteristic of the Fig. 2 embodiment and a detailed statement of the method of operation is not believed to be necessary.

I claim:

1. In a plant for producing hot gases under pressure, the combination of a combustion gas turbine, a gas compressor driven by said turbine, a combustion nozzle for generating the combustion gas for operating said turbine, a heat exchanger through which the combustion gases pass, means for delivering a part of the gas from said compressor to said nozzle and another part through said heat exchanger to an output pipe, a fuel supply to said combustion nozzle, a pair of control devices in said outlet pipe responsive to different properties of the gas flowing therethrough, means actuated by one control device to regulate the turbine speed, whereby a change in the turbine speed due to the departure of one property of the outflowing gas from a selected value results in a change in that property of the gas to which the second control device responds, and means actuated by the second control device to regulate the fuel supply.

2. In a plant for producing hot gases under pressure, the invention as claimed in claim 1, wherein one control device is a thermostat and the other is a quantity meter.

3. In a plant for producing hot gases under pressure, the invention as claimed in claim 1, wherein one control device is a thermostat and the other is a pressure gauge.

4. In a plant for producing hot gases under pressure, the invention as claimed in claim 1, wherein the means for regulating the turbine speed includes a bypass pipe for supplying gas from said compressor to the inlet of said turbine for admixture with combustion gases from said combustion nozzle, and a valve in said bypass pipe operable by the associated control device.

5. In a plant for producing hot gases under pressure, the invention as claimed in claim 1, wherein the means for regulating the turbine speed includes a bypass pipe for supplying gas from said compressor to the inlet of said turbine for admixture with combustion gases from said combustion nozzle, said compressor is a multistage air compressor, and means is provided for supplying air to said bypass pipe from an intermediate stage of said air compressor.

6. In a plant for producing hot gases under pressure, the invention as claimed in claim 1, wherein said means for regulating the speed of said turbine includes an auxiliary turbine having an inlet supply controlled by the first of said control means.

7. In the operation of a compressor plant including a combustion gas turbine driving a turbine, and a combustion chamber for producing motive gas for said turbine and for heating a portion of the compressor output for delivery to a point of use, the method of regulating the operation of the turbine which comprises controlling the turbine speed in accordance with variation in one property of the heated output gas, and controlling the fuel supply to the combustion chamber in accordance with changes in another property of the heated output gas.

8. In the operation of a compressor plant including a combustion gas turbine driving a compressor for delivering air to a combustion nozzle to generate combustion gases for operating the turbine and to an output pipe after passing in heat exchange relation to the combustion gases, a bypass for supplying air to said turbine around said combustion nozzle, and means for regulating the fuel supply to said combustion nozzle; the method of regulating said turbine to maintain predetermined properties of the air at said outlet pipe substantially constant which comprises controlling the flow of air through said bypass in accordance with one property of the air flowing through said output pipe, and controlling the fuel supply to said combustion nozzle in accordance with another property of the air flowing through said output pipe.

9. In the operation of a compressor plant including a combustion gas turbine driving an air compressor, a combustion nozzle receiving air from said compressor and fuel from a fuel pump, and an outlet pipe through which air flows from said compressor after passing in heat exchange relation to combustion gas produced by said combustion nozzle, the method of regulating the operation of said turbine that comprises independently controlling two properties of the motive gas supplied to said turbine in accordance with changes in two characteristics of the air flowing through said outlet pipe.

HANS PFENNINGER.